(No Model.)

H. M. GRAY.
DRIVE CHAIN.

No. 264,280. Patented Sept. 12, 1882.

ATTEST:
Jacob Felbel.
Robert Blissert

INVENTOR:
Henry M. Gray
By atty
J. N. McIntire

United States Patent Office.

HENRY MILLAR GRAY, OF LONDON, COUNTY OF SURREY, ENGLAND, ASSIGNOR TO THE EWART MANUFACTURING COMPANY, OF CHICAGO, ILL.

DRIVE-CHAIN.

SPECIFICATION forming part of Letters Patent No. 264,280, dated September 12, 1882.

Application filed July 25, 1882. (No model.)

*To all whom it may concern:*

Be it known that I, HENRY MILLAR GRAY, of Poplar Walk Road, London, in the county of Surrey, England, have invented certain new and useful Improvements in Drive-Chains; and I do hereby declare that the following is a full, clear, and exact description thereof, reference being had to the accompanying drawings, making part of this application.

My invention relates to an improvement in what are known as "detachable chains," and has for its main object to render such chains better adapted to run on carding-machines and wherever else very small chain-wheels are used, and the chain run in such a manner that both sides have (at different times) to work against the wheel's periphery.

As heretofore made detachable chains have been found more or less objectionable for the purposes mentioned; or, in other words, have not worked satisfactorily when used under the conditions just above described on account of the extreme liability to accidental separation of the parts in the frequent removal and replacement of the chain, and also on account of the inefficiency to work alike with either one or the other faces of the chain running next to or against the periphery of the chain-wheel.

The best detachable chain made prior to my invention for the uses above mentioned is what is widely known in the markets as the "Ewart" chain; but in this form of detachable chain the difficulties mentioned render it undesirable for the purposes alluded to.

I have overcome the objections mentioned by the construction of detachable chain in such manner that not only is there less liability of any casual uncoupling of the parts, but the teeth of the chain-wheels will work perfectly and equally well against the nose of the link, no matter which side of the chain has to be run next to the wheel's periphery; and my invention consists in a detachable chain of the construction hereinafter more fully explained, and particularly specified in the claims of this specification.

To enable those skilled in the art to make and use my invention, I will now proceed to more fully describe the construction and operation of my improved chain, referring by letters to the accompanying drawings, forming part of this specification, and in which—

Figure 4:
Figure 1:
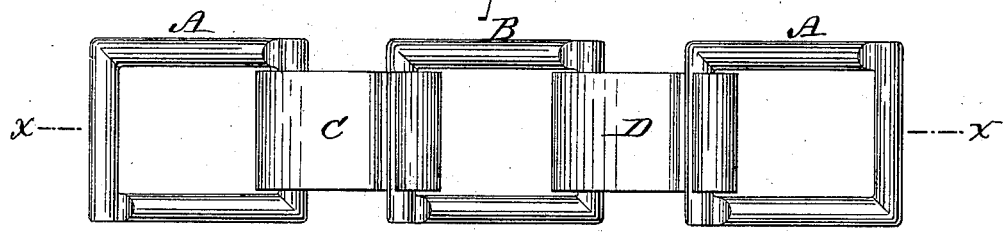
Figure 3:
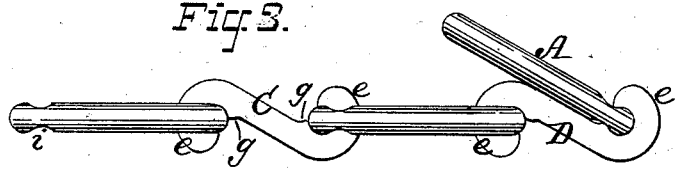
Figure 2:
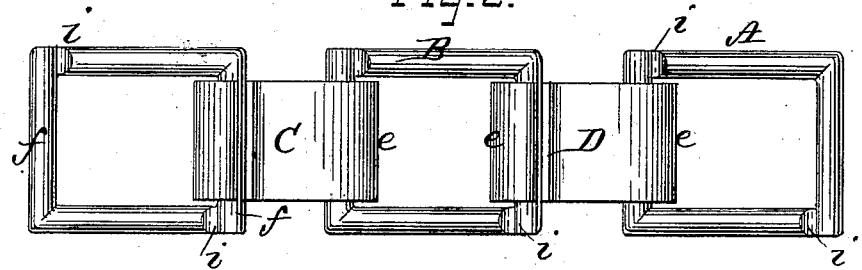

Figure 1 is a face view of one side of a chain made according to my invention. Fig. 2 is a similar view, looking at the opposite side; Fig. 3, an edge view, with one of the links turned into a position (relatively to the next link) to permit a detachment of said link; Fig. 4, a longitudinal central section at the line $x\ x$ of Fig. 1.

In the several figures the same part will be found designated by the same letter of reference.

A and B are the centrally-open plain or flat rectangular links, and C D the connecting-links, each one of which is formed or provided at each end with a coupler-hook, $e$, with which is coupled in an articulate manner one of the plain cylindrical end bars of one of the links A or B. The conformation of each coupler-hook $e$ is such that the throat or opening thereof is not large enough to permit the passage through it of the end bar, $f$, of the link coupled to said hook, a sort of lip-like projection or rib, $g$, on the link C projecting toward the point or edge of the coupler-hook, as shown; but one or both of the side bars of each of the plain open links A B is or are formed with a depression or cut-away at $i$, so that whenever a plain link and a coupler-hook shall be turned into the relative position illustrated at the right-hand side of Fig. 3, for instance, these parts of the chain may be separated by a sidewise movement of the parts relatively, very much after the fashion of uncoupling the parts of a Ewart detachable chain. There will, however, be observed this difference between my improved form of chain and the Ewart, viz: that in the chain shown the parts just above alluded to must be brought into a relative position such that the plain link will have its side bars in a plane parallel to the plane of the body portion of the coupler-link. The object and advantage of this difference are that in my improved chain not only is casual uncoupling of the parts in taking off from and putting onto the wheels the chain less liable, but the parts are not as liable to uncouple in running the chain over very small wheels and in every direction.

The depression $i$ in the side bars of the plain links I propose to make as seen at link A and at link B. For many uses it will be preferable to have these depressions *i* located at points in the link diagonally opposite, as shown at links A and B, in order that any such link shall have to be moved at either end (relatively to the hook with which such end is coupled) in a direction opposite to that in which the other end must be moved to do the uncoupling.

It will be seen that in a chain such as shown and described the sprockets or teeth of the chain-wheel will always get a good bearing on the nose-like portions of the links, no matter which surface or side of the chain runs against the wheel, and that thus the improved chain is admirably adapted for use in all places where a drive-chain has to be reversed or has to be run both ways over the various wheels of a series—as, for instance, in carding-machines.

What I claim as new, and desire to secure by Letters Patent, is—

A detachable drive-chain composed of alternately-arranged plain links A B, provided with recesses or notches, and S-shaped links C D, having open coupler-hooks on opposite sides, and having these parts each constructed and combined, substantially as described, so that they can be uncoupled only when the bodies of the links are brought into parallel planes and close together, substantially as hereinbefore set forth.

In witness whereof I have hereunto set my hand this 27th day of June, 1882.

HENRY MILLAR GRAY.

Witnesses:
ALFRED ODDY,
ADAM ODDY.